United States Patent
Zhongquan

(10) Patent No.: US 11,975,494 B2
(45) Date of Patent: May 7, 2024

(54) NOZZLE AND APPLICATOR SYSTEM FOR FABRIC BONDING

(71) Applicant: NORDSON CORPORATION, Westlake, OH (US)

(72) Inventor: Qiu Zhongquan, Minhang District (CN)

(73) Assignee: Nordson Corporation, Westlake, OH (US)

( * ) Notice: Subject to any disclaimer, the term of this patent is extended or adjusted under 35 U.S.C. 154(b) by 44 days.

(21) Appl. No.: 17/269,130

(22) PCT Filed: Sep. 4, 2019

(86) PCT No.: PCT/US2019/049420
§ 371 (c)(1),
(2) Date: Feb. 17, 2021

(87) PCT Pub. No.: WO2020/068381
PCT Pub. Date: Apr. 2, 2020

(65) Prior Publication Data
US 2021/0323242 A1    Oct. 21, 2021

Related U.S. Application Data

(60) Provisional application No. 62/735,799, filed on Sep. 24, 2018.

(51) Int. Cl.
*B29C 65/52*     (2006.01)
*B05B 1/14*      (2006.01)
(Continued)

(52) U.S. Cl.
CPC .............. *B29C 65/522* (2013.01); *B05B 1/14* (2013.01); *B05C 5/0237* (2013.01);
(Continued)

(58) Field of Classification Search
CPC ... B29C 65/522; B29C 66/431; B29C 66/729; B29C 65/4815; B29C 66/21;
(Continued)

(56) References Cited

U.S. PATENT DOCUMENTS 4,031,355 A * 6/1977 Leonik, Jr. ......... G05D 23/1932
                                                    392/480
4,251,312 A * 2/1981 Ziegler, Jr. ........ B29C 66/8221
                                                    156/499
(Continued)

FOREIGN PATENT DOCUMENTS

CN          1986075 A       6/2007
CN          101014457 A     8/2007
(Continued)

OTHER PUBLICATIONS

ISA/220—Notification of Transmittal or Search Report and Written Opinion of the ISA, or the Declaration dated Nov. 26, 2019 for WO Application No. PCT/US19/049420.

*Primary Examiner* — Christopher W Raimund
(74) *Attorney, Agent, or Firm* — BakerHostetler

(57) ABSTRACT

Nozzle assemblies and methods of bonding fabric by jetting an adhesive are disclosed. A method of bonding fabrics with an adhesive includes receiving the adhesive from an adhesive supply into a nozzle assembly. The nozzle assembly has a valve seat, a valve stem configured to slidably move towards and away from the valve seat, and a plurality of outlet channels. The method further includes jetting the adhesive from the plurality of outlet channels onto a first fabric and applying a second fabric to the first fabric to adhere the first and second fabrics to each other.

20 Claims, 8 Drawing Sheets

(51) Int. Cl.
  B05C 5/02   (2006.01)
  B29C 65/00  (2006.01)
  B29L 31/48  (2006.01)
(52) U.S. Cl.
  CPC .......... B05C 5/0275 (2013.01); B29C 66/431 (2013.01); B29C 66/729 (2013.01); B29L 2031/48 (2013.01)
(58) Field of Classification Search
  CPC ..... B29C 66/244; B29C 66/232; B29C 66/43; B29C 65/4805; B05B 1/14; B05B 1/306; B05C 5/0237; B05C 5/0275; B29L 2031/48; C09J 175/04; D06H 5/00
  See application file for complete search history.

(56) References Cited

U.S. PATENT DOCUMENTS

| | | | | |
|---|---|---|---|---|
| 5,217,169 A | * | 6/1993 | Faulkner, III | B05C 5/0275 |
| | | | | 137/881 |
| 6,153,034 A | * | 11/2000 | Lipsker | B33Y 70/00 |
| | | | | 156/167 |
| 2003/0010439 A1 | | 1/2003 | Fenton | |
| 2005/0137549 A1 | * | 6/2005 | Lindsay | A61F 13/15593 |
| | | | | 604/385.01 |
| 2007/0145164 A1 | * | 6/2007 | Ahmadi | B05C 5/0275 |
| | | | | 239/562 |
| 2011/0300295 A1 | | 12/2011 | Clark et al. | |
| 2012/0292405 A1 | * | 11/2012 | Clark | B05C 5/0225 |
| | | | | 239/291 |

FOREIGN PATENT DOCUMENTS

| | | | | |
|---|---|---|---|---|
| CN | 103108702 A | | 5/2013 | |
| CN | 106102933 A | | 11/2016 | |
| EP | 1802191 A2 | | 6/2007 | |
| EP | 3117909 A1 | | 1/2017 | |
| JP | 2009-022915 A | | 2/2009 | |
| JP | 2010-179211 A | | 8/2010 | |
| JP | 2014-058757 A | | 4/2014 | |
| JP | 2014058757 A | * | 4/2014 | .......... B29C 65/524 |
| WO | 2011/087960 A1 | | 7/2011 | |

* cited by examiner

NOZZLE AND APPLICATOR SYSTEM FOR FABRIC BONDING

CROSS REFERENCE TO RELATED APPLICATIONS

This application is a National Stage Application of International Patent App. No. PCT/US2019/049420, filed Sep. 4, 2019, which claims the benefit of U.S. Provisional Patent App. No. 62/735,799, filed Sep. 24, 2018, the entire disclosures of both of which are hereby incorporated by reference as if set forth in their entirety herein.

TECHNICAL FIELD

This disclosure generally relates to applicator systems for applying a material to a substrate and, more particularly to a nozzle assembly for use in an applicator system for applying a material to fabric.

BACKGROUND

In the garment manufacturing field, applicator systems are commonly used to apply a material, such as a polyurethane (PUR) glue, to a fabric or cloth for binding pieces of the fabric or cloth together. When bonding pieces of fabric together, an applicator system is required that has the ability to spray a small amount of a material with a high degree of accuracy and precision. For example, the width of the desired strip of material to be applied to a fabric can have requirements of less than 8 mm in width and less than 0.2 mm in height. In many currently existing applicator systems, material is sprayed with low levels of accuracy and precision, which can result in the spraying of excessive amounts of material.

Additionally, applicator systems are difficult to adjust to create the desired pattern of dispensed material. Often, not enough material is applied to the fabric to create a sufficient bond. If more material is desired, separate application processes are run, resulting in longer manufacturing times, increased machinery wear, and added costs.

Therefore, there is a need for an applicator system that can be adjusted to accurately jet material in the desired patterns and amounts without requiring excess application times.

SUMMARY

The foregoing needs are met by the various embodiments of applicator systems and nozzle assemblies disclosed. According to one embodiment, a method of bonding fabrics with an adhesive includes receiving the adhesive from an adhesive supply into a nozzle assembly. The nozzle assembly has a valve seat, a valve stem configured to slidably move towards and away from the valve seat, and a plurality of outlet channels. The method further includes jetting the adhesive from the plurality of outlet channels onto a first fabric and applying a second fabric to the first fabric to adhere the first and second fabrics to each other.

According to another embodiment, a nozzle assembly for jetting an adhesive to bond fabrics includes a body defining a chamber therein between an inlet and an outlet. The chamber is configured to receive the adhesive through the inlet and to allow the adhesive to exit through the outlet. The nozzle assembly further includes a valve seat disposed adjacent to the outlet, a valve stem configured to slidably move within the chamber towards and away from the valve seat and to contact the valve seat, and a plurality of outlet channels in fluid communication with the outlet of the chamber. Each of the plurality of outlet channels is configured to receive the adhesive from the chamber. The valve stem is configured to impact the valve seat such that a discrete volume of the adhesive is forcefully ejected from the plurality of outlet channels due to the momentum of the impact between the valve stem and the valve seat onto a fabric.

According to another embodiment, an applicator system for jetting an adhesive onto a fabric includes a material supply for storing the adhesive, a pump fluidly connected to the material supply, a valve for controlling operation of the pump, and a nozzle assembly configured to receive the adhesive from the pump and to jet the adhesive onto the fabric. The nozzle assembly includes a body defining a chamber therein between an inlet and an outlet, with the chamber being configured to receive the adhesive through the inlet and to allow the adhesive to exit through the outlet. The nozzle assembly further includes a valve seat disposed adjacent to the outlet, a valve stem configured to slidably move within the chamber towards and away from the valve seat and to contact the valve seat, and a plurality of outlet channels in fluid communication with the outlet of the chamber. Each of the plurality of outlet channels is configured to receive the adhesive from the chamber. The valve stem is configured to impact the valve seat such that a discrete volume of the adhesive is forcefully ejected from the plurality of outlet channels due to the momentum of the impact between the valve stem and the valve seat onto the fabric.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown.

Aspects of the disclosure will now be described in detail with reference to the drawings, wherein like reference numbers refer to like elements throughout, unless specified otherwise.

DETAILED DESCRIPTION OF ILLUSTRATIVE EMBODIMENTS

Figure 1:
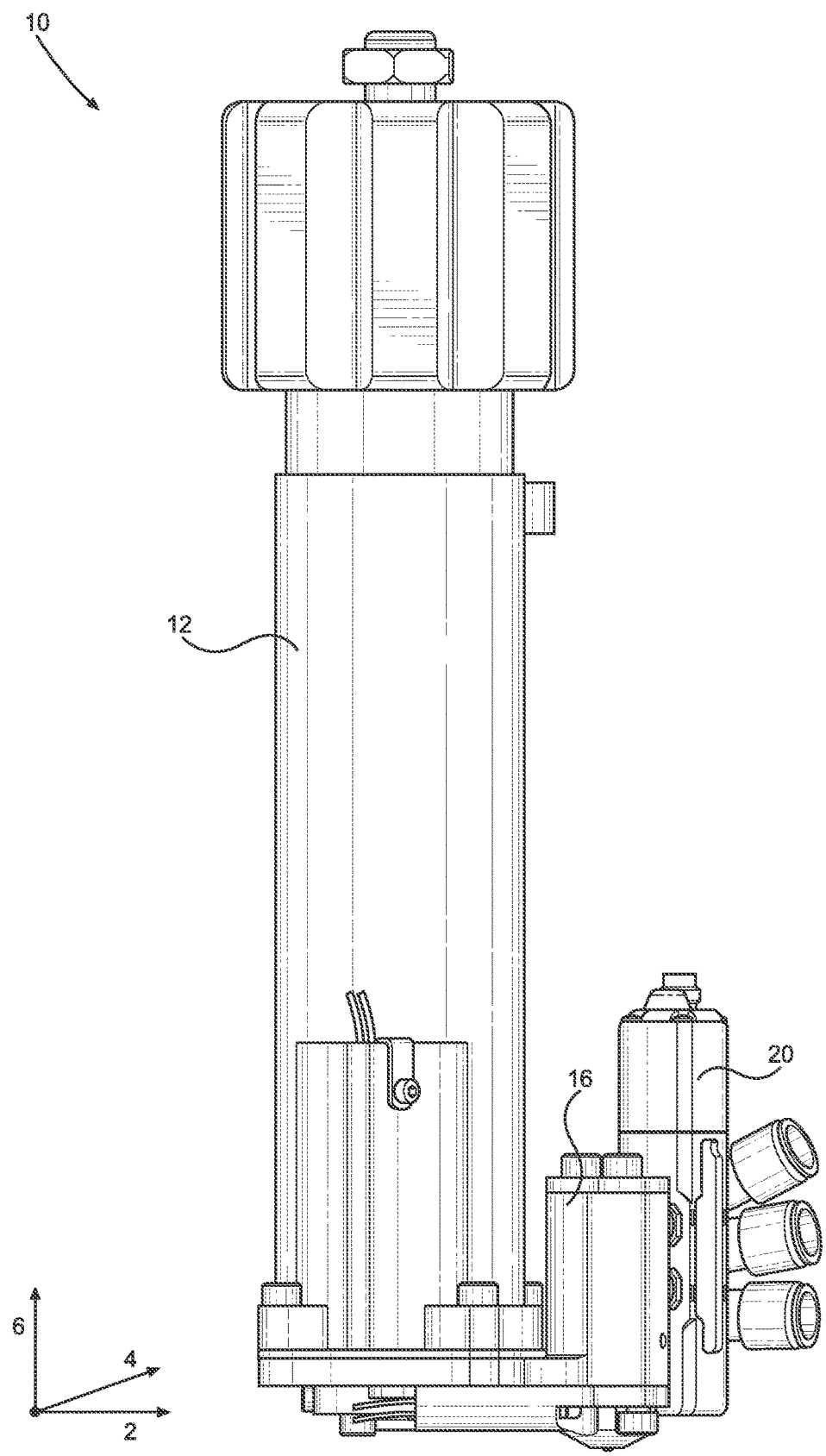
FIG. 1 is an isometric view of an applicator system according to an embodiment of the present disclosure.
Figure 2:
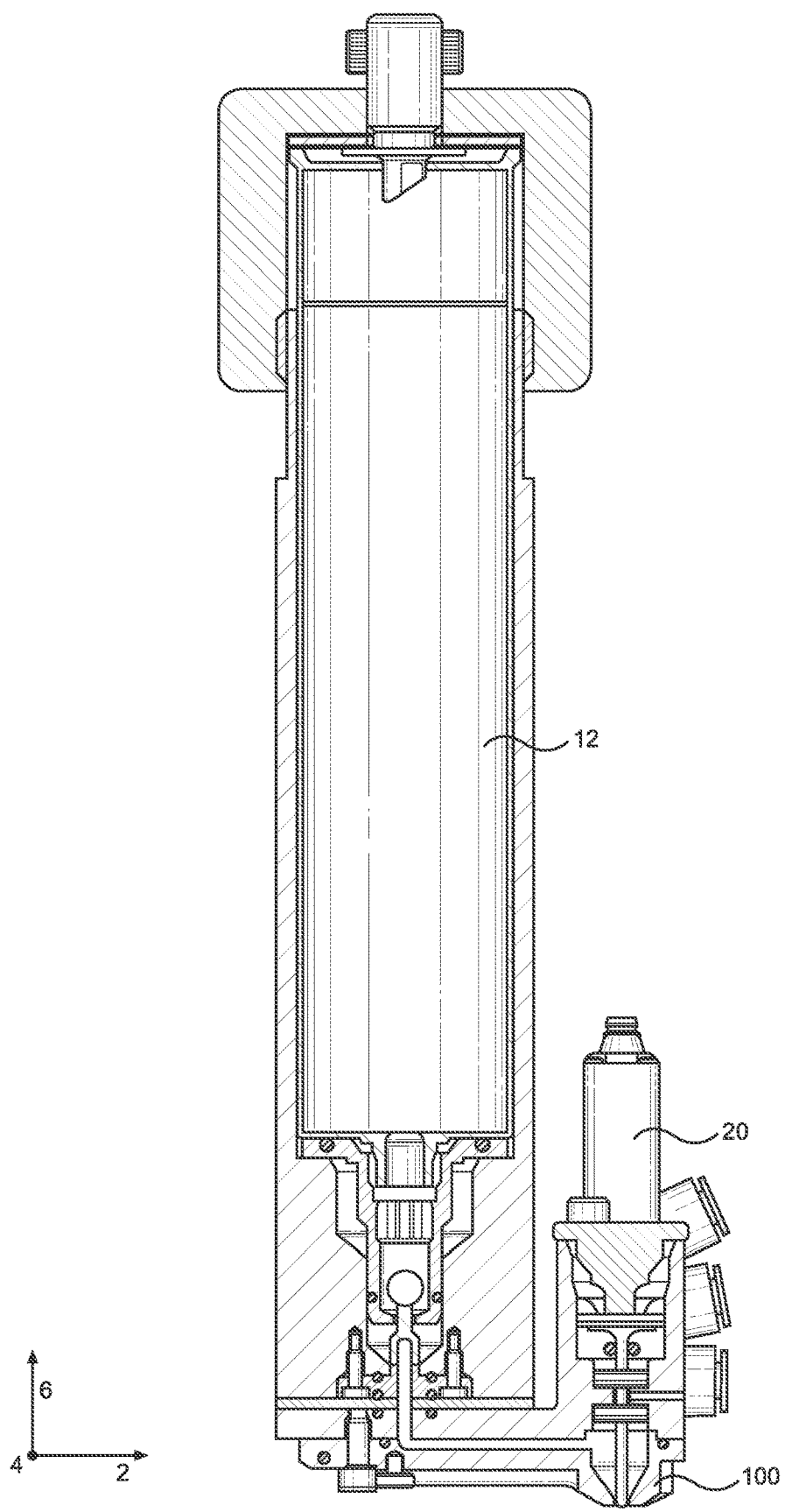
FIG. 2 is a cross-sectional view of the applicator system of FIG. 1.
Figure 3:
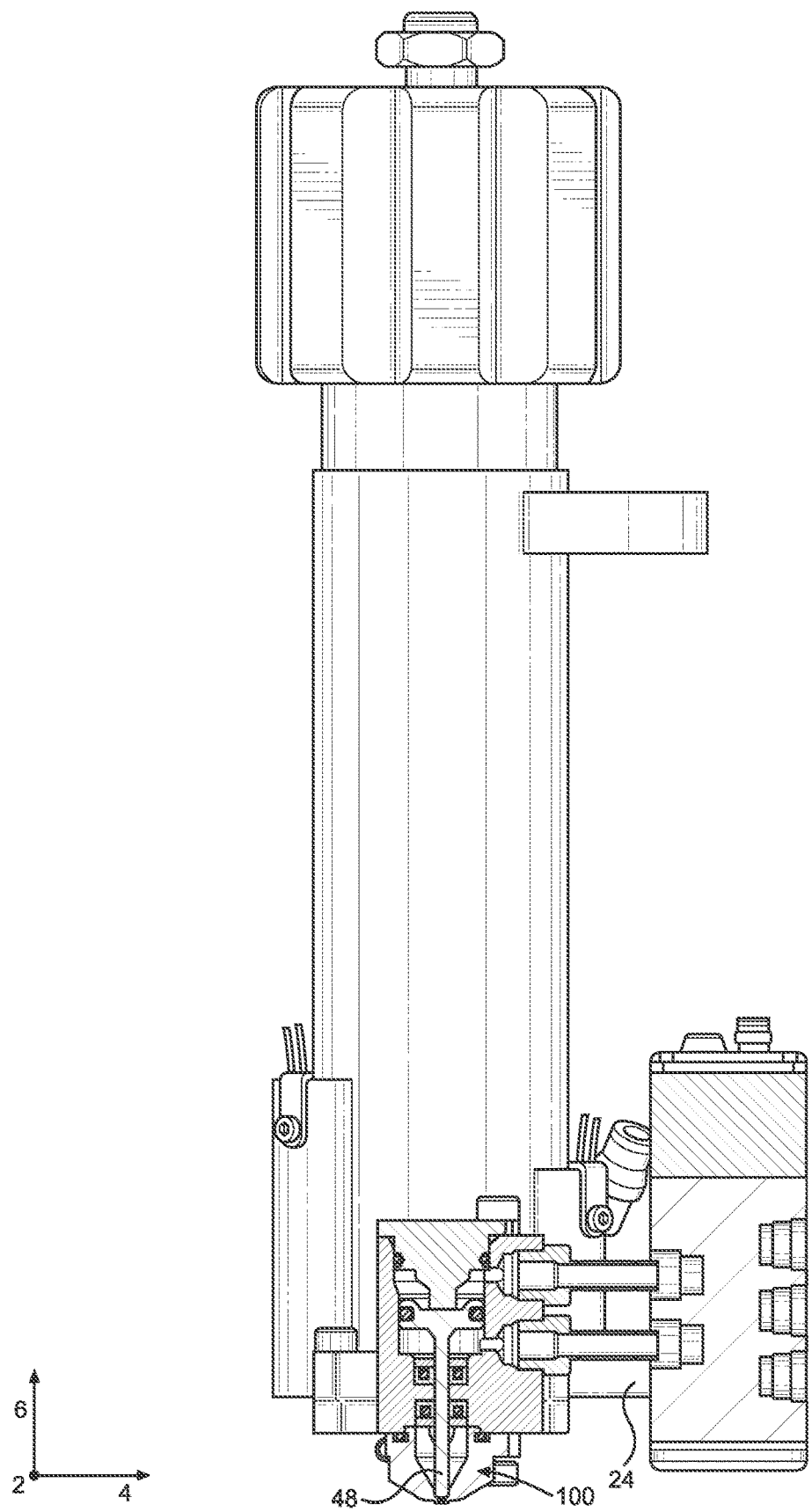
FIG. 3 is another cross-sectional view of the applicator system of FIGS. 1 and 2.
Figure 4:
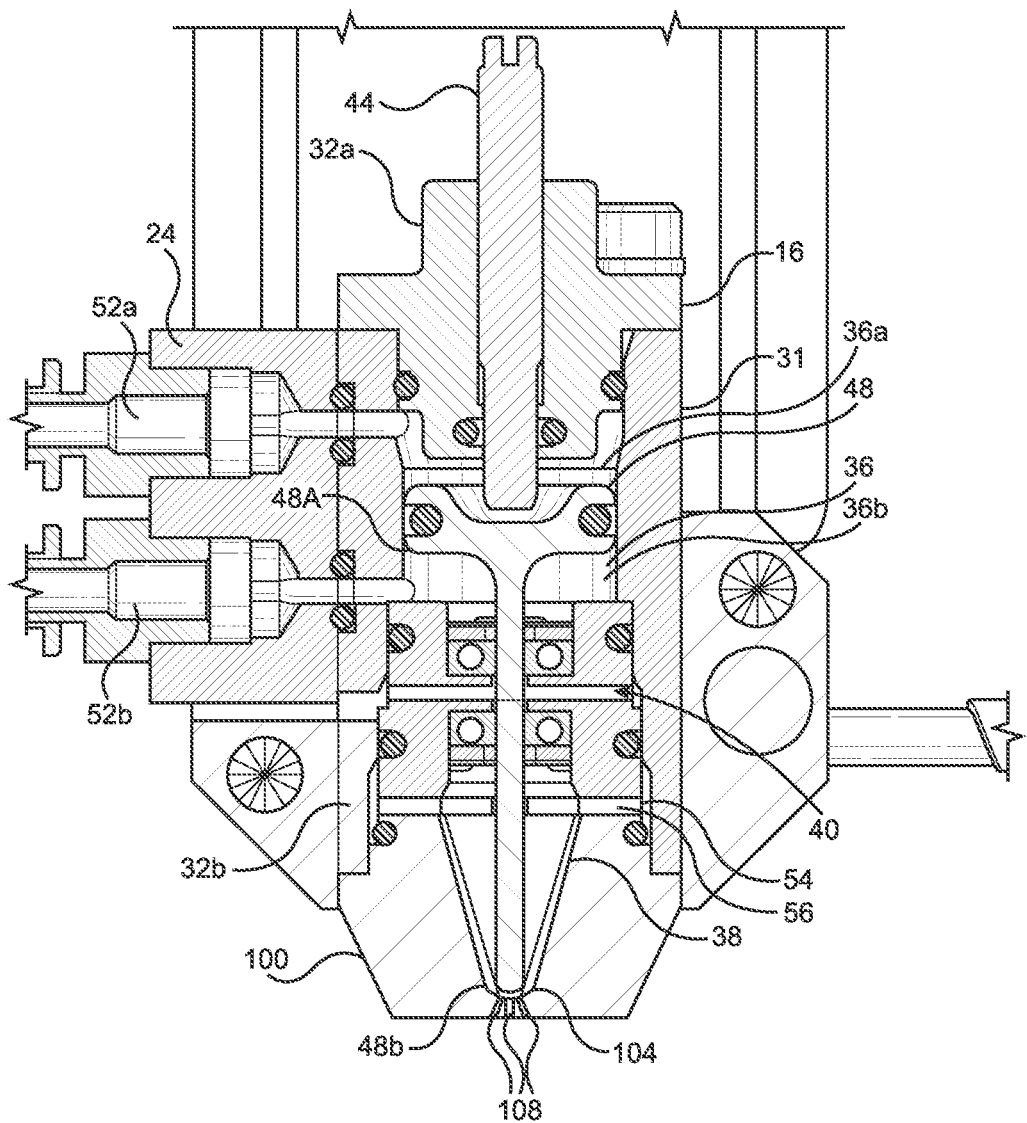
FIG. 4 is a cross-sectional view of a portion of an applicator system according to an embodiment of the present disclosure.
Figure 6:
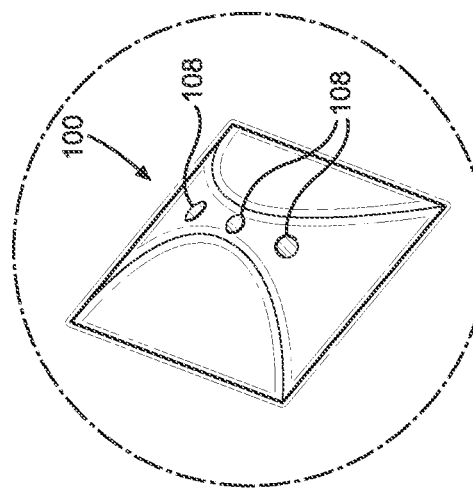
FIG. 6 is a close-up perspective view of the nozzle of the applicator system of FIG. 5.
Figure 5:
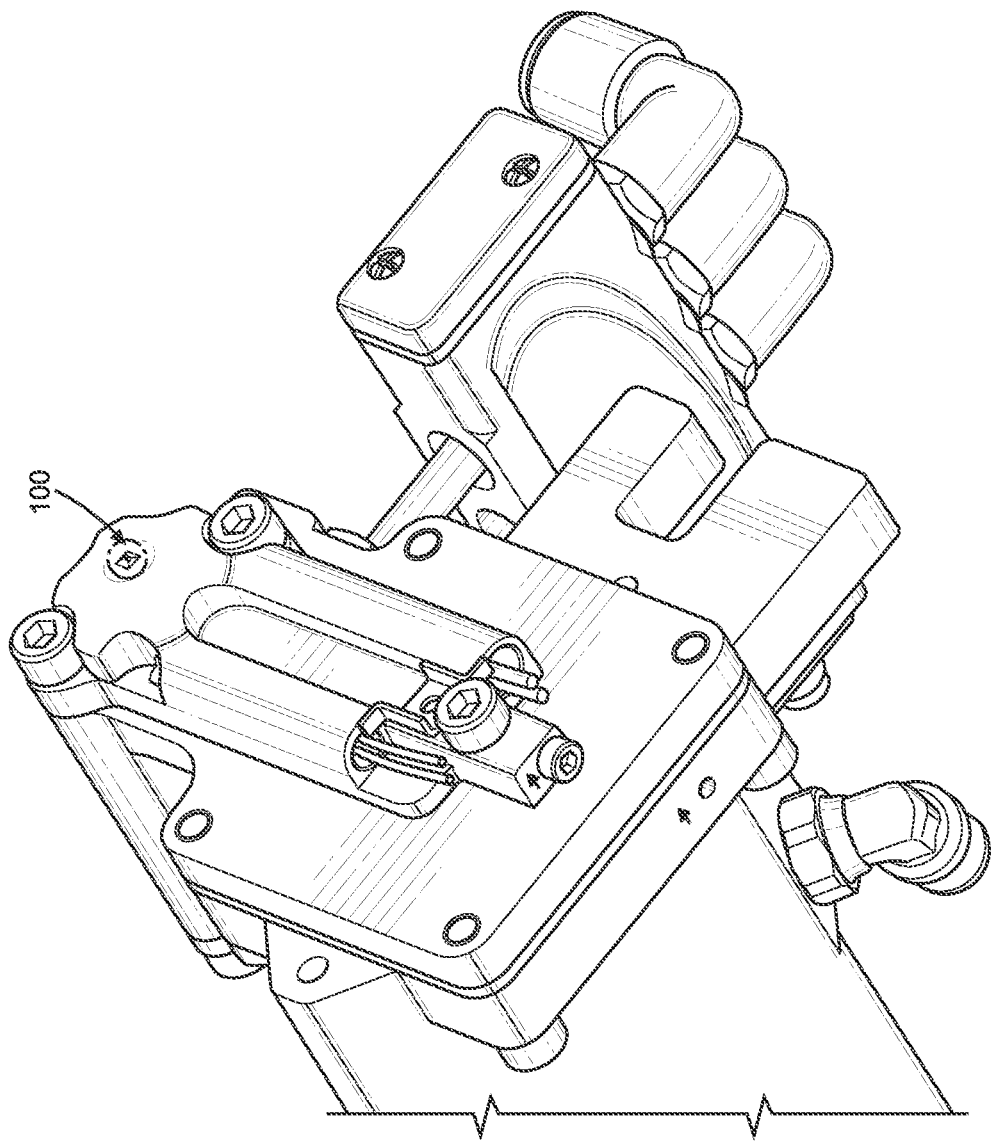
FIG. 5 is an isometric view of a portion of an applicator system having a nozzle according to another embodiment.

Described herein is an applicator system 10 and a related nozzle assembly 100 for spraying a material onto a substrate. Certain terminology is used to describe the applicator system 10 in the following description for convenience only and is not limiting. The words "right," "left," "lower," and "upper" designate directions in the drawings to which reference is made. The words "inner" and "outer" refer to directions toward and away from, respectively, the geometric center of the description to describe the applicator system 10 and related parts thereof. The words "forward" and "rearward" refer to directions in a longitudinal direction 2 and a direction opposite the longitudinal direction 2 along the applicator system 10 and related parts thereof. The terminology includes the above-listed words, derivatives thereof, and words of similar import.

Unless otherwise specified herein, the terms "horizontal," "lateral," and "vertical" are used to describe the orthogonal directional components of various components of the applicator system 10, as designated by the longitudinal direction 2, lateral direction 4, and vertical direction 6. It should be appreciated that while the longitudinal and lateral directions 2 and 4 are illustrated as extending along a horizontal plane, and the vertical direction 6 extends in a direction that is normal to the horizontal plane, the planes that encompass the various directions may differ during use.

Referring to FIGS. 1-4, the applicator system 10 includes a material supply 12 for storing a supply of the material. The material can be received by material supply 12 in a pre-packaged syringe (not shown), directly filled into a reservoir defined within the material supply 12, or pumped to the material supply 12 from an external supply (not shown) spaced from the applicator system 10. In some embodiments, the material may be a glue, such as polyurethane (PUR) glue, though other materials are contemplated. The material supply 12 can be configured to melt and/or maintain the material at an elevated temperature while it remains within the material supply 12. In some embodiments, the material supply 12 can be designed to hold up to 300 cubic centimeters (cc) of material, though the material supply 12 can be larger or smaller as desired. The material supply 12 can include a heating element (not shown) to provide heat to the material within the material supply 12, or, alternatively, to maintain a desired temperature within the material supply 12. This prevents the material from cooling when it is being dispensed, thus preserving the desired material flow properties. In some embodiments, the applicator system 10 may include a second heating element (not shown) that is configured to maintain the material (e.g. adhesive) at a different temperature than the heating element described above.

The applicator system 10 also includes a pump 16 fluidly connected to the material supply 12. The pump 16 can include a body 31 comprising a top component 32a and a middle component 32b attached to and positioned below the top component 32a. It will be understood that the pump 16 can alternatively define a monolithic body or have any other number of components.

The body 31 of the pump 16 defines a substantially hollow body, such that an upper chamber 36 and a lower chamber 38 are defined within the body 31. A seal pack 40 is positioned within the body 31 and divides the interior of the body 31 into the upper and lower chambers 36, 38.

A nozzle 100 can be removably coupled to the body 31 and positioned, for example, below the middle component 32b. The nozzle 100 can be selected from a plurality of nozzles 100 that are each configured to jet different patterns. In alternative embodiments, the nozzle 100 can be part of the monolithic body 31. The lower chamber 38 may be disposed within the nozzle 100. A valve seat 104 is disposed at the lower end of the lower chamber 38 and is defined by the nozzle 100. A plurality of outlet channels 108 are disposed adjacent to the valve seat 104 and extend through the nozzle 100. The plurality of outlet channels 108 are in fluid communication with the lower chamber 38.

The pump 16 also includes a firing pin 48 positioned within the body 31. The firing pin 48 defines an upper end 48a and a valve stem 48b that extends from the upper end 48a along the vertical direction 6. The upper end 48a is positioned within the upper chamber 36, while the valve stem 48b extends from the upper end 48a through the upper chamber 36, through the seal pack 40, and into the lower chamber 38.

In operation, the firing pin 48 is configured to reciprocate within the body 31 between a retracted and an extended position. This reciprocation can be caused by pressurized air that flows into the upper chamber 36 through first and second air paths 52a, 52b. Each of first and second air paths 52a, 52b can receive pressurized air from a valve 20, which is connected to the pump 16 through connector 24. The valve 20 can be a pneumatic valve, an electronic valve, or any other type of valve as desired. The upper end 48a of the firing pin 48 divides the upper chamber 36 into first and second portions 36a, 36b, where the first portion 36a can receive pressurized air from the first air path 52a, and the second portion 36b can receive pressurized air from the second air path 52b. When pressurized air flows through the first air path 52a and into the first portion 36a of the upper chamber 36, the firing pin 48 is driven downwards along the vertical direction 6 into an extended position. In contrast, when pressurized air flows through the second air path 52b and into the second portion 36b of the upper chamber 36, the firing pin 48 is driven upwards along the vertical direction 6 into a retracted position.

Continuing with FIGS. 1-4, the pump 16 includes a circumferential chamber 54 defined between an outer surface of the nozzle 100 and an inner surface of the middle component 32b. The circumferential chamber 54 is fluidly connected to the material supply 12, such that the circumferential chamber 54 is configured to receive material from the material supply 12 and allow the material to flow through the circumferential chamber 54 to radial holes 56 defined within the nozzle 100. The material can then flow through the radial holes 56 to the lower chamber 38. In some embodiments, the radial holes 56 comprise four radial holes spaced equidistantly circumferentially around the nozzle 100. However, it is contemplated that the radial holes 56 can comprise more or less holes, as well as holes having non-equidistant spacing.

When the firing pin 48 is in the retracted position, the valve stem 48b is spaced from the valve seat 104 defined by the nozzle 100. In this position, material flows through the circumferential chamber 54, through the radial holes 56, and into the lower chamber 38. Then, when the firing pin 48 is transitioned into the extended position, the valve stem 48b of the firing pin 48 moves rapidly downward along the vertical direction 6 through the lower chamber 38 towards the valve seat 104. During this transition, the firing pin 48 causes an amount of the material within the lower chamber 38 to be discharged through the outlet channels 108. When in the extended position, the lower end of the valve stem 48b may contact the valve seat 104 and thus create a fluid seal between the lower chamber 38 and each of the outlet channels 108, or may be positioned slightly above the valve seat 104.

When the firing pin 48 transitions from the retracted position to the extended position along the vertical direction 6, the firing pin 48 travels a distance that can be referred to as the stroke length. The required stroke length can vary between dispensing operations, types of materials dispensed, wear of internal parts over time, etc. As a result, the stroke length can be adjusted using the limiting rod 44, which extends through the top component 32a of the body 31 and into the first portion 36a of the upper chamber 36. When the firing pin 48 is in the retracted position, the upper end 48a can contact the lower end of the limiting rod 44, such that the limiting rod 44 controls the how far upwards the firing pin 48 moves in the retracted position. The limiting rod 44 can threadedly engage the top component 32a, such that rotation of the limiting rod 44 relative to the top component 32a moves the limiting rod 44 further into or out of the upper chamber 36, thus changing the maximum upward position of the firing pin 48 in the retracted position, and likewise the stroke length.

Figure 9:
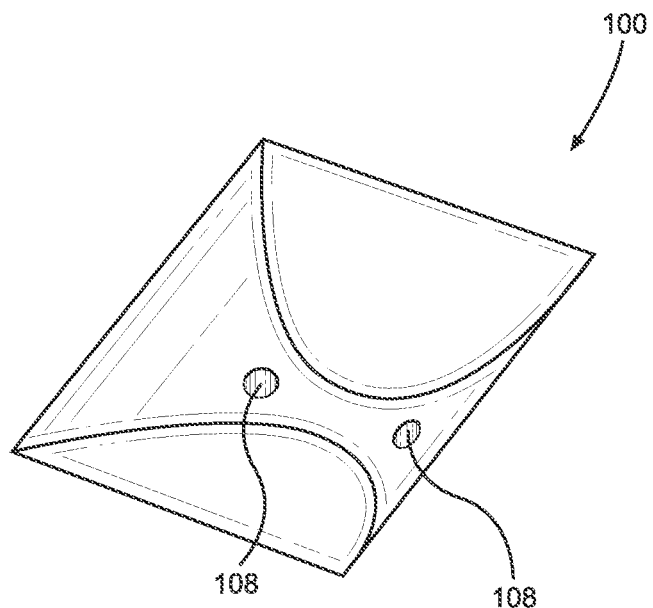
FIG. 9 is a close-up perspective view of a nozzle according to another embodiment.
Figure 10:
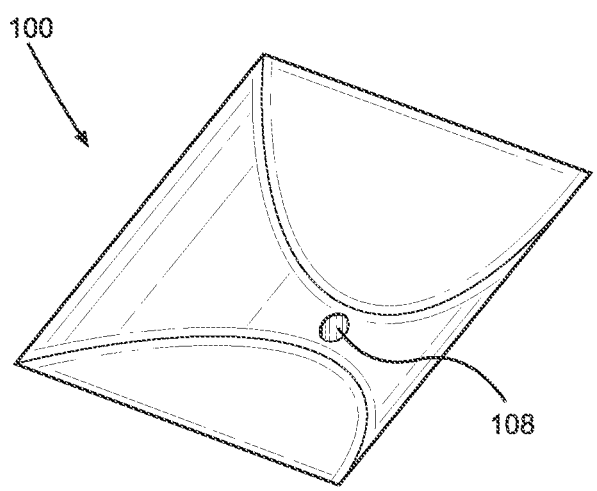
FIG. 10 is a close-up perspective view of a nozzle according to yet another embodiment.

Referring to FIGS. 4-7, the nozzle 100 may include three outlet channels 108, although it will be understood that the nozzle 100 may include another suitable number of outlet channels 108, for example, one, two, four, five, or six outlet channels. For example, illustrative embodiments depicted in FIGS. 9 and 10 show suitable nozzles 100 having one outlet channel 108 and two outlet channels 108, respectively. Each of the outlet channels 108 may be disposed at an angle from the vertical direction 6 between 0° and 90°. In some embodiments, some or all of the outlet channels 108 may be parallel to one or more of the other outlet channels 108 and may be disposed along the vertical direction 6. The specific angle of each of the outlet channels 108 can depend on the size and/or shape of the valve seat 104, the size and/or shape of the valve stem 48b, the material that is being dispensed, on the desired distance between the droplets dispensed from each of the outlet channels 108, or on other manufacturing requirements and/or preferences.

When the firing pin 48 transitions from the retracted position to the extended position and then from the extended position back to the retracted position, this can be referred to as a stroke. With each stroke, the material within the lower chamber 38 of the nozzle 100 is moved through the outlet channels 108. The firing pin 48 is configured to impact the valve seat 104, such that a discrete volume of the material is forcefully ejected (i.e. jetted) from the nozzle towards the substrate 200 due to the momentum of the impact between the valve stem 48b of the firing pin 48 and the valve seat 104. Jetting is contrasted with extrusion or other types of material dispensing, where liquid material is dispensed as a continuous, elongate filament, generally referred to as a "bead" of adhesive. While drops can be formed by rapidly opening and closing a valve during extrusion of liquid material, or by using air to break up an extruded bead as it is dispensed, these processes are distinctly different from jetting processes, in which the discrete liquid mass is rapidly ejected directly from the dispenser at a high velocity when the firing pin 48 strikes the valve seat 104. The liquid material (e.g. adhesive) is received into the lower chamber 38 at a low pressure and is jetted out of the lower chamber 38 at a higher pressure. The high pressure is developed as the valve stem 48b is moved towards the valve seat 104. When the valve stem 48b impacts the valve seat 104, a portion of the liquid material (in the form of a droplet or a dot) can break away from the nozzle assembly 100. So, in some embodiments, the jetted material can be separated from the nozzle assembly 100 before it contacts the substrate 200.

By providing a plurality of outlet channels 108, a single stroke can result in the dispensing of multiple droplets from the nozzle 100 onto a substrate 200. It will be understood that the stroke length, the amount of material present in the lower chamber 38, and the number and dimensions of the outlet channels 108 are all parameters that can be modified to achieve the desired dispensing.

In the exemplary embodiments of FIGS. 4-7, three outlet channels 108 are depicted in the nozzle 100. With each stroke of the firing pin 48, three separate droplets are jetted from the nozzle 100 onto the substrate 200 (see FIG. 8). This allows for simultaneous dispensing of more material, resulting in decreased manufacturing time and associated costs. The number and arrangement of the outlet channels 108 can be adjusted based on the desired usage, which adds versatility to each dispensing device and nozzle 100.

Figure 7:
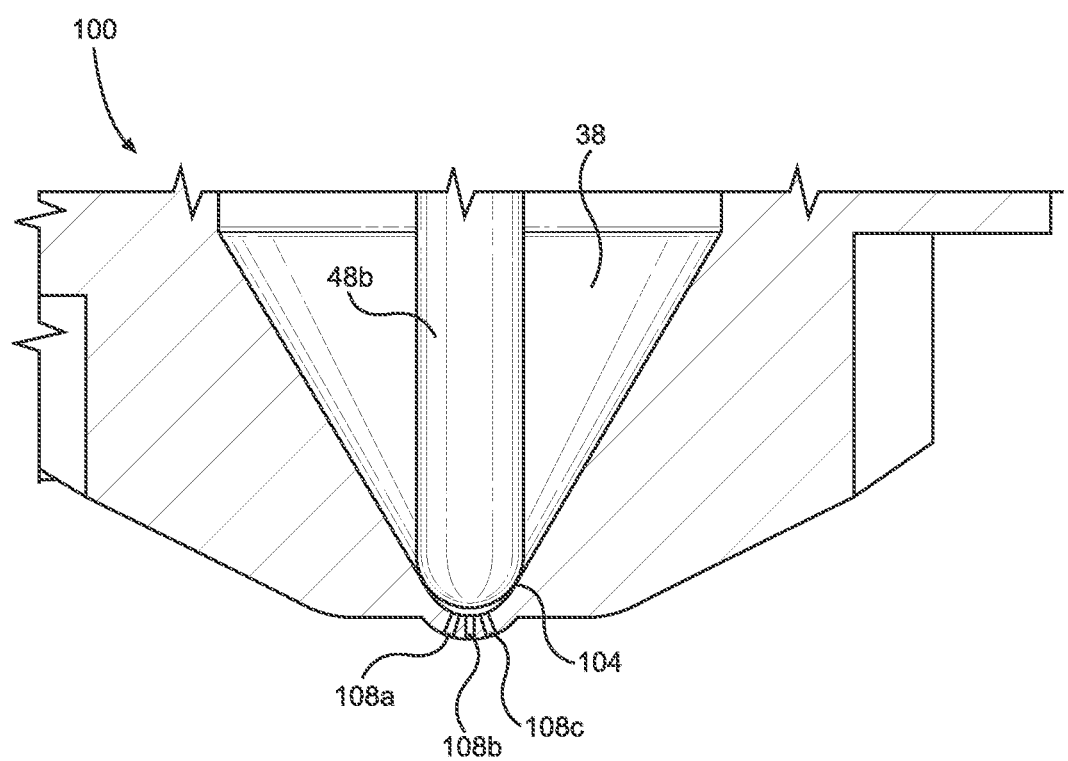
FIG. 7 is a cross-sectional view of a nozzle according to an embodiment.
Figure 8:
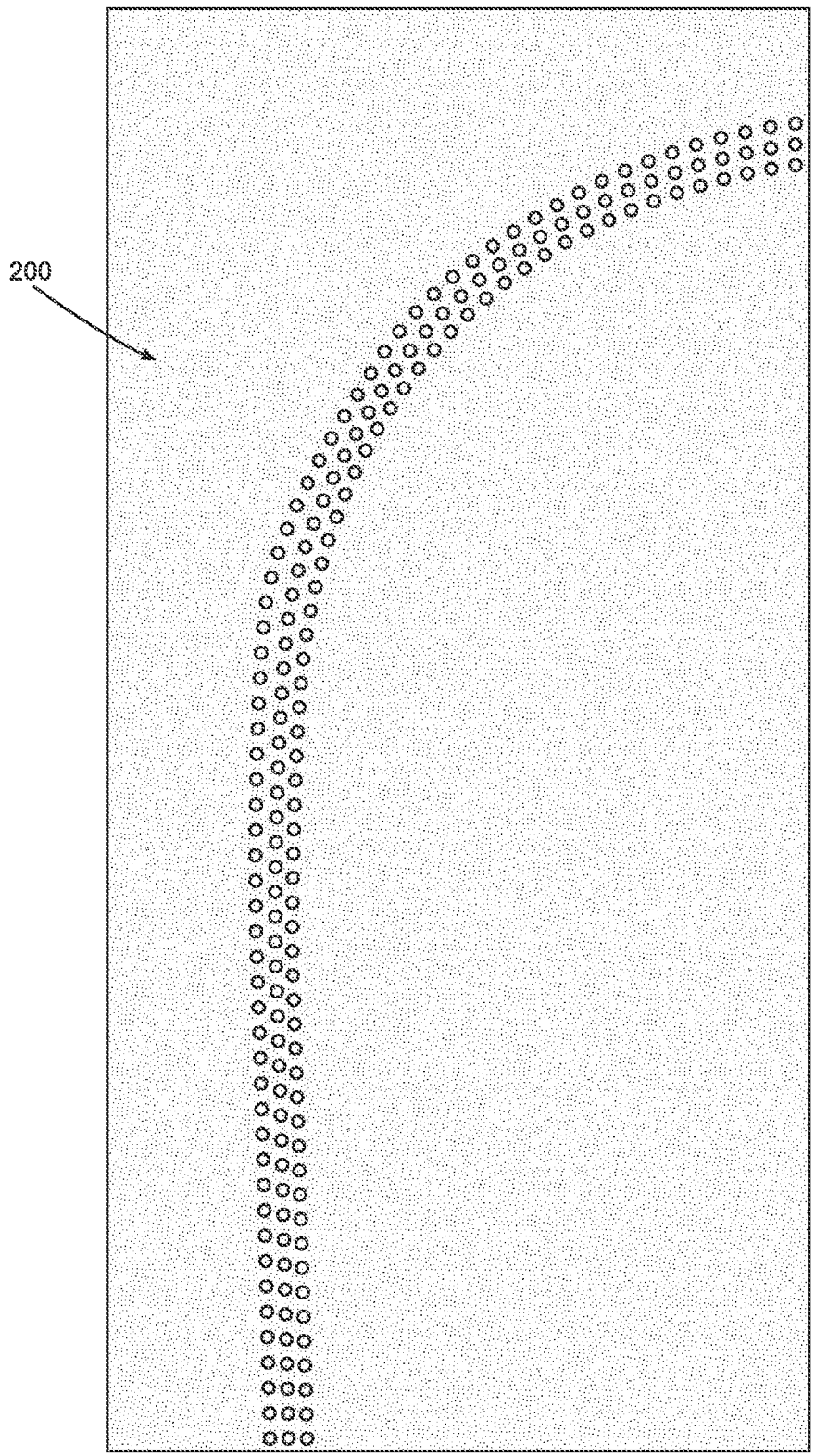
FIG. 8 is a top perspective view of a substrate with dispensed material according to an embodiment.

The distance between adjacent droplets that are dispensed onto the substrate 200 can be controlled by the distance between the outlet channels 108 and the angle of each outlet channel 108 relative to the vertical direction 6. Alternatively, or additionally, the distance between dispensed droplets can be altered by moving the nozzle 100 closer to or farther from the substrate 200. In some embodiments, such as depicted in FIG. 7, a first outlet channel 108a is disposed along the vertical direction 6, a second outlet channel 108b is disposed at an angle between 0° and 90° from the vertical direction 6 in the negative horizontal direction 4, and a third outlet channel 108c is disposed at an angle between 0° and 90° from the vertical direction 6 in the positive horizontal direction 4 opposite the negative horizontal direction. In this depicted embodiment, the distance on the substrate 200 between each of the three droplets dispensed from the outlet channels 108a, 108b, and 108c will positively correlate with the distance of the nozzle 100 from the substrate 200.

Specific arrangements of the outlet channels 108 on the nozzle 100 can also determine the dispensing pattern on the substrate 200. If will be appreciated that the desired pattern will depend on the specific substrate, application use, material being dispensed, and on other manufacturing parameters, and that this specification is not limited to any specific dispensing patterns. The applicator system 10 may include a movement mechanism configured to move the applicator system 10 and/or the nozzle 100 in two, four, or six degrees of motion.

In some embodiments, the applicator system 10 can be used for bonding fabric materials. For example, the applicator system 10 may dispense a plurality of droplets of adhesive material, such as polyurethane (PUR) glue, onto a fabric substrate, which is then configured to receive and adhere to a different portion thereof or to a separate fabric material. By bonding multiple fabrics, a garment can be assembled with or without stitching.

While systems and methods have been described in connection with the various embodiments of the various figures, it will be appreciated by those skilled in the art that changes could be made to the embodiments without departing from the broad inventive concept thereof. It is understood, therefore, that this disclosure is not limited to the particular embodiments disclosed, and it is intended to cover modifications within the spirit and scope of the present disclosure as defined by the claims.

What is claimed is:

1. A method of bonding fabrics with an adhesive, the method comprising:
   receiving the adhesive from an adhesive supply into a chamber of a body of a nozzle assembly, the nozzle assembly having a valve seat disposed in the body at a lower end of the chamber, a valve stem configured to slidably move within the chamber towards and away from the valve seat, and a plurality of outlet channels, each of the plurality of outlet channels disposed in the body of the nozzle assembly directly adjacent to the valve seat and being configured to receive a discrete portion of the adhesive directly from the chamber;
   jetting the adhesive from the plurality of outlet channels onto a first fabric by moving the valve stem towards the valve seat and impacting the valve stem onto the valve seat directly adjacent the plurality of outlet channels, such that a fluid seal is created directly between the chamber and each of the plurality of outlet channels, each discrete portion of the adhesive is provided directly from the chamber to one of the plurality of outlet channels, and a discrete volume of the adhesive is forcefully ejected directly from the chamber through the plurality of outlet channels due to the momentum of the impact between the valve stem and the valve seat; and
   applying a second fabric to the first fabric to adhere the first and second fabrics to each other.

2. The method of claim 1, wherein jetting the adhesive includes jetting a substantially equal portion of the adhesive through each of the plurality of outlet channels.

3. The method of claim 1, wherein the first fabric and the second fabric are both part of a single integrated piece of fabric, and applying the second fabric to the first fabric includes folding the single integrated piece of fabric.

4. The method of claim 1, wherein the first fabric is separate from the second fabric.

5. The method of claim 1, wherein jetting the adhesive includes jetting the adhesive through three outlet channels onto the first fabric.

6. The method of claim 1, wherein jetting the adhesive includes jetting the adhesive through two outlet channels onto the first fabric.

7. The method of claim 1, further comprising:
   orienting the nozzle assembly in a first configuration and jetting the adhesive from the plurality of outlet channels onto the first fabric, such that the jetted adhesive on the first fabric forms a first pattern; and
   orienting the nozzle assembly in a second configuration different from the first configuration and jetting the adhesive from the plurality of outlet channels onto the first fabric, such that the jetted adhesive on the first fabric forms a second pattern different from the first pattern.

8. The method of claim 1, wherein the plurality of outlet channels are uniformly distributed in an arc end part of the body of the nozzle assembly adjacent to the valve seat and each outlet channel of the plurality of outlet channels has a centerline directed toward a center of the arc end part of the body of the nozzle assembly.

9. A nozzle assembly for jetting an adhesive to bond fabrics, the nozzle assembly comprising:
   a body defining a chamber therein between an inlet and an outlet, the chamber being configured to receive the adhesive through the inlet and to allow the adhesive to exit through the outlet;
   a valve seat disposed in the body of the nozzle assembly at a lower end of the chamber adjacent to the outlet;
   a valve stem configured to slidably move within the chamber towards and away from the valve seat and to contact the valve seat; and
   a plurality of outlet channels in fluid communication with the outlet of the chamber, each of the plurality of outlet channels disposed in the body of the nozzle assembly directly adjacent to the valve seat and being configured to receive a discrete portion of the adhesive directly from the chamber,
   wherein the valve stem is configured to impact the valve seat directly adjacent the plurality of outlet channels, such that a fluid seal is created directly between the chamber and each of the plurality of outlet channels, each discrete portion of the adhesive is provided directly from the chamber to one of the plurality of outlet channels, and a discrete volume of the adhesive is forcefully ejected directly from the chamber through the plurality of outlet channels onto a first fabric due to the momentum of the impact between the valve stem and the valve seat.

10. The nozzle assembly of claim 9, wherein when the valve stem is moved toward the valve seat, the adhesive in the chamber is moved towards and through the outlet.

11. The nozzle assembly of claim 9, wherein each of the plurality of outlet channels is configured to receive a substantially equal portion of the adhesive from the chamber.

12. The nozzle assembly of claim 9, further comprising a fluid-tight seal between the valve stem and the valve seat when the valve stem is in contact with the valve seat to prevent the adhesive from moving out of the chamber through the outlet.

13. The nozzle assembly of claim 9, wherein the plurality of outlet channels are splayed relative to each other, such that at least some of the plurality of outlet channels face different directions.

14. The nozzle assembly of claim 9, wherein the plurality of outlet channels includes three outlet channels.

15. The nozzle assembly of claim 9, wherein the plurality of outlet channels includes two outlet channels.

16. The nozzle assembly of claim 9, wherein the plurality of outlet channels are uniformly distributed in an arc end part of the body of the nozzle assembly adjacent to the valve seat and each outlet channel of the plurality of outlet channels has a centerline directed toward a center of the arc end part of the body of the nozzle assembly.

17. An applicator system for jetting an adhesive onto a fabric, the applicator system comprising:
   a material supply for storing the adhesive; and
   a nozzle assembly configured to receive the adhesive from the material supply and to jet the adhesive onto the fabric, the nozzle assembly comprising:
      a body defining a chamber therein between an inlet and an outlet, the chamber being configured to receive the adhesive through the inlet and to allow the adhesive to exit through the outlet;
      a valve seat disposed in the body of the nozzle assembly at a lower end of the chamber adjacent to the outlet;
      a valve stem configured to slidably move within the chamber towards and away from the valve seat and to contact the valve seat; and
      a plurality of outlet channels in fluid communication with the outlet of the chamber, each of the plurality of outlet channels disposed in the body of the nozzle assembly directly adjacent to the valve seat and being configured to receive a discrete portion of the adhesive directly from the chamber, wherein the valve stem is configured to impact the valve seat directly adjacent the plurality of outlet channels, such that a fluid seal is created directly between the chamber and each of the plurality of outlet channels, each discrete portion of the adhesive is provided directly from the chamber to one of the plurality of outlet channels, and a discrete volume of the adhesive is forcefully ejected directly from the chamber through the plurality of outlet channels onto the fabric due to the momentum of the impact between the valve stem and the valve seat.

18. The applicator system of claim 17, wherein the material supply further includes a heating element configured to heat the adhesive in the material supply.

19. The applicator system of claim 17, wherein the nozzle assembly is configured to be oriented in six-degrees of freedom relative to the fabric.

20. The applicator system of claim 17, wherein the plurality of outlet channels are uniformly distributed in an arc end part of the body of the nozzle assembly adjacent to the valve seat and each outlet channel of the plurality of outlet channels has a centerline directed toward a center of the arc end part of the body of the nozzle assembly.

* * * * *